United States Patent [19]
Niimura

[11] Patent Number: 6,161,184
[45] Date of Patent: Dec. 12, 2000

[54] DATA STORING MEDIUM PROCESSING APPARATUS FOR STORING PROGRAM TO BE EXECUTED IN VOLATILE MEMORY AREA WITH NO BACK-UP BATTERY

[75] Inventor: Takashi Niimura, Yokohama, Japan

[73] Assignee: Kabushiki Kaisha Toshiba, Kawasaki, Japan

[21] Appl. No.: 08/933,096

[22] Filed: Sep. 18, 1997

[30] Foreign Application Priority Data

Sep. 30, 1996 [JP] Japan ................................. 8-259942

[51] Int. Cl.[7] .......................... G06F 11/30; G06F 12/14; H04L 9/00; H04L 9/32
[52] U.S. Cl. ................................. 713/200; 326/8; 380/3
[58] Field of Search .......................... 713/200, 300, 713/320, 323, 201, 202; 326/8; 365/185.04; 380/3; 705/18, 44; 711/163

[56] References Cited

U.S. PATENT DOCUMENTS

| | | | |
|---|---|---|---|
| 5,642,480 | 6/1997 | Brownlee et al. | 713/200 |
| 5,668,945 | 9/1997 | Ohba et al. | 713/200 |
| 5,758,121 | 5/1998 | Fukuzumi | 713/300 |
| 5,781,784 | 7/1998 | McKinley | 713/300 |
| 5,901,285 | 5/1999 | Labatte et al. | 713/200 |
| 5,915,025 | 6/1999 | Taguchi | 713/200 |
| 5,920,690 | 7/1999 | Moyer et al. | 713/200 |
| 5,928,361 | 7/1999 | Nishimura et al. | 713/200 |
| 5,949,882 | 9/1999 | Angelo | 713/200 |

*Primary Examiner*—Robert W. Beausoliel, Jr.
*Assistant Examiner*—Robert G. Crockett
*Attorney, Agent, or Firm*—Pillsbury Madison & Sutro LLP

[57] ABSTRACT

A data processing apparatus comprises function for receiving a power supply from outside of the apparatus, and erasing a program stored in a volatile memory when the power supply is stopped, function for receiving the program from an external apparatus and storing the program in a volatile memory having no backup battery, and function for processing data in accordance with the stored program.

18 Claims, 10 Drawing Sheets

DATA STORING MEDIUM PROCESSING APPARATUS FOR STORING PROGRAM TO BE EXECUTED IN VOLATILE MEMORY AREA WITH NO BACK-UP BATTERY

BACKGROUND OF THE INVENTION

This invention relates to a data processing apparatus such as a card reader (a card processing terminal), provided to a gate having an entrance management system or the like, for executing predetermined data processing by receiving an IC card of each passenger.

The entrance management system comprises a management apparatus for unitarily managing information about each passenger, and a card reader for receiving an IC card of each passenger and executing a predetermined data processing to determine whether or not the passenger may enter. In necessity, the card reader transmits identification information to the data management apparatus or vice versa, during the predetermined data processing.

A card reader comprises a MPU for mainly controlling the operation of the card reader; a memory for storing a program for controlling the operation of the MPU; a memory for storing data to be used during the operation of the MPU; an interface (an external interface) between the card reader and an external apparatus such as a data management apparatus; and a card interface for receiving the card inserted by the passenger to read/write information from/in the card.

When the card reader is turned on and the MPU is released from being reset, the MPU reads program/data from a predetermined memory area and operates in accordance with the read program. In this time, the program is stored in a read-only memory (or non-volatile memory in which no data is written during the normal operation), and thus the operation of the card reader is determined when the card is inserted into the card reader. Accordingly, if the user wishes to change the program after the system starts to run, the memory itself must be replaced.

Recently, the program may be changed without changing the memory even after the system is turned on, by reading a new program from the external apparatus via the external interface to write in the memory.

In the conventional information apparatus such as a card reader, however, all the execution programs for determining the operation of the apparatus are stored in a non-volatile memory such as a ROM (including EPROM and EEPROM) wherein all the data are not lost even if the apparatus is turned off. Accordingly, when an execution program is wished to be changed, the non-volatile memory itself must be replaced, or a new program must be rewritten in the memory. The same may be said of the case where only the application part of the program for processing information transmitted between the card reader and the external apparatus is wished to be changed without changing a firmware (i.e., a part of the program for controlling the basic operations of a hardware). Both the replacing and rewriting operations need a long period of time to be performed.

In addition, if the apparatus having such an execution program stored in a non-volatile memory is stolen, the program can be easily analyzed to be used for an illegal object. Such an apparatus thus has a problem in security.

BRIEF SUMMARY OF THE INVENTION

The object of the present invention is to provide a data processing apparatus with high security, capable of preventing the data processing program/data from being used for an illegal object.

The present invention provides a data processing apparatus (FIGS. 1A, 1B, 1C) comprising means (9, 15, 17, 19, S21, S23) for receiving a power supply from outside of the apparatus, and erasing a program stored in the volatile memory when the power supply is stopped; means (1, 2, 3, 4, S12-5) for receiving the program from an external apparatus (8) and storing the program in a volatile memory (3) having no backup battery; and means (1, 2, 3, 5, S16-3) for processing data in accordance with the stored program.

According to the conventional data processing, the data processing program written in a ROM will be easily copied when an IC card reader is stolen. By virtue of the above-mentioned structure of the present invention, when an IC card reader is stolen, the power supply from the outside is stopped, and thus the data processing program stored in the memory device such as a RAM having no back-up battery is lost. In this manner, the present invention can provide high security to the data processing apparatus such as a card reader.

The present invention also provides a data processing apparatus (FIGS. 1A, 1B, 1C) comprising means (1, 2, 3, 4, S12-5) for receiving a program for processing data from an external apparatus (8) and storing the program in a volatile memory (3) having no backup battery; means (1, 2, 3, 5, S16-3) for processing data in accordance with the stored program; means (9, 15, 17, 19, S21, S23) for receiving a power supply from outside of the apparatus, and erasing the program stored in the volatile memory when the power supply is stopped; and means (1, 2, 3, 4, S42, S43) for receiving an encrypted program to process data from the external apparatus, and storing the encrypted program in the volatile memory having no backup battery.

The above-mentioned data processing apparatus brings the same effect as that of the aforementioned apparatus: the program is lost when the power supply to the apparatus is stopped. In addition thereto, the data processing apparatus receives encrypted programs from an external apparatus such as a host computer and synthesizes the encrypted programs and stores the program in a memory device such as a RAM. In this manner, the apparatus of the present invention attains remarkably high security even when the program/data is being stored into the memory device.

It is further understood by those skilled in the art that the same advantage as described above can be also attained by using the method disclosed by the present invention without departing from the scope thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1A:
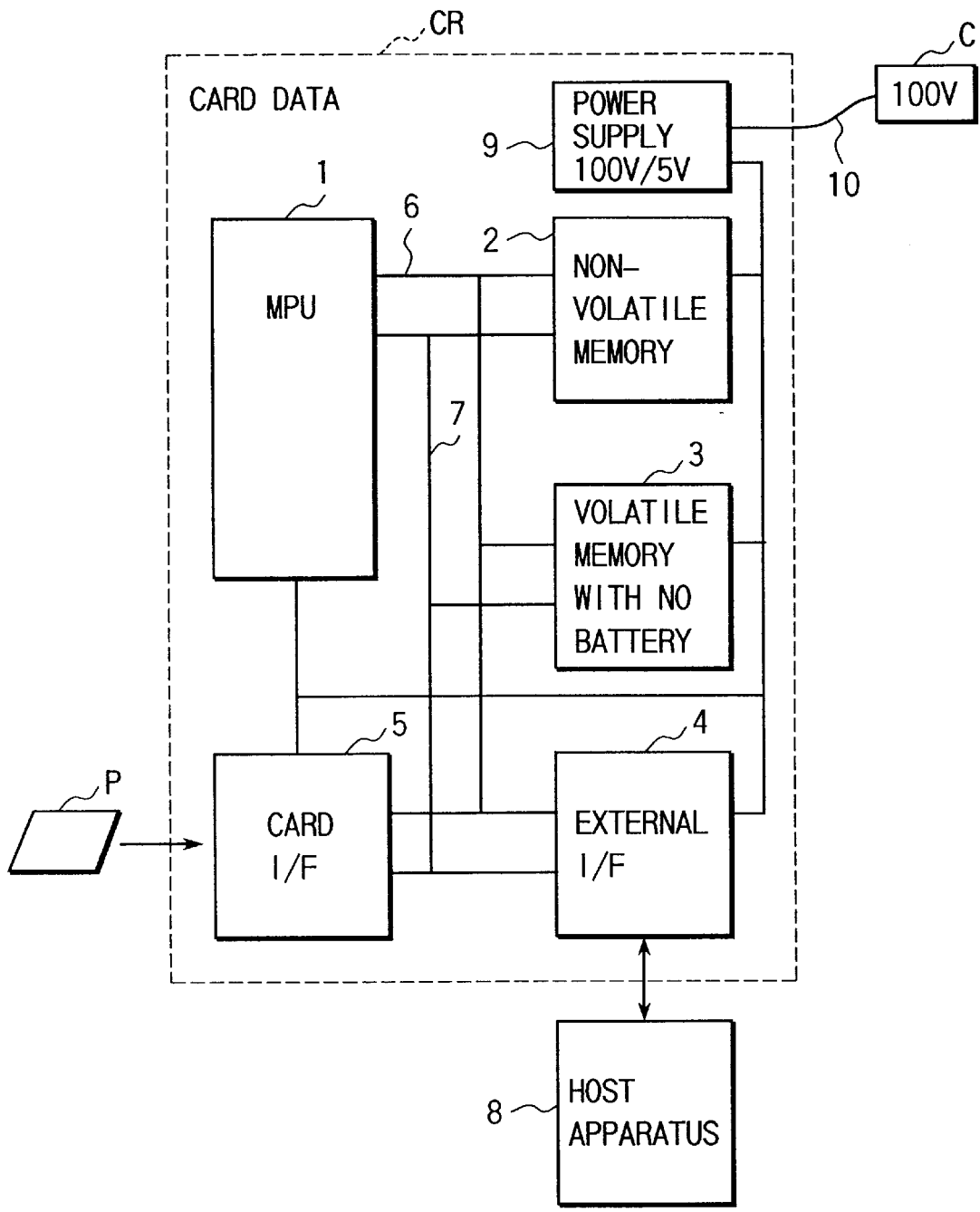
FIGS. 1A, 1B, and 1C are schematic views of the structures of card readers (data processing apparatuses) according to the embodiment of the present invention, which are used for entrance management systems.
Figure 1B:
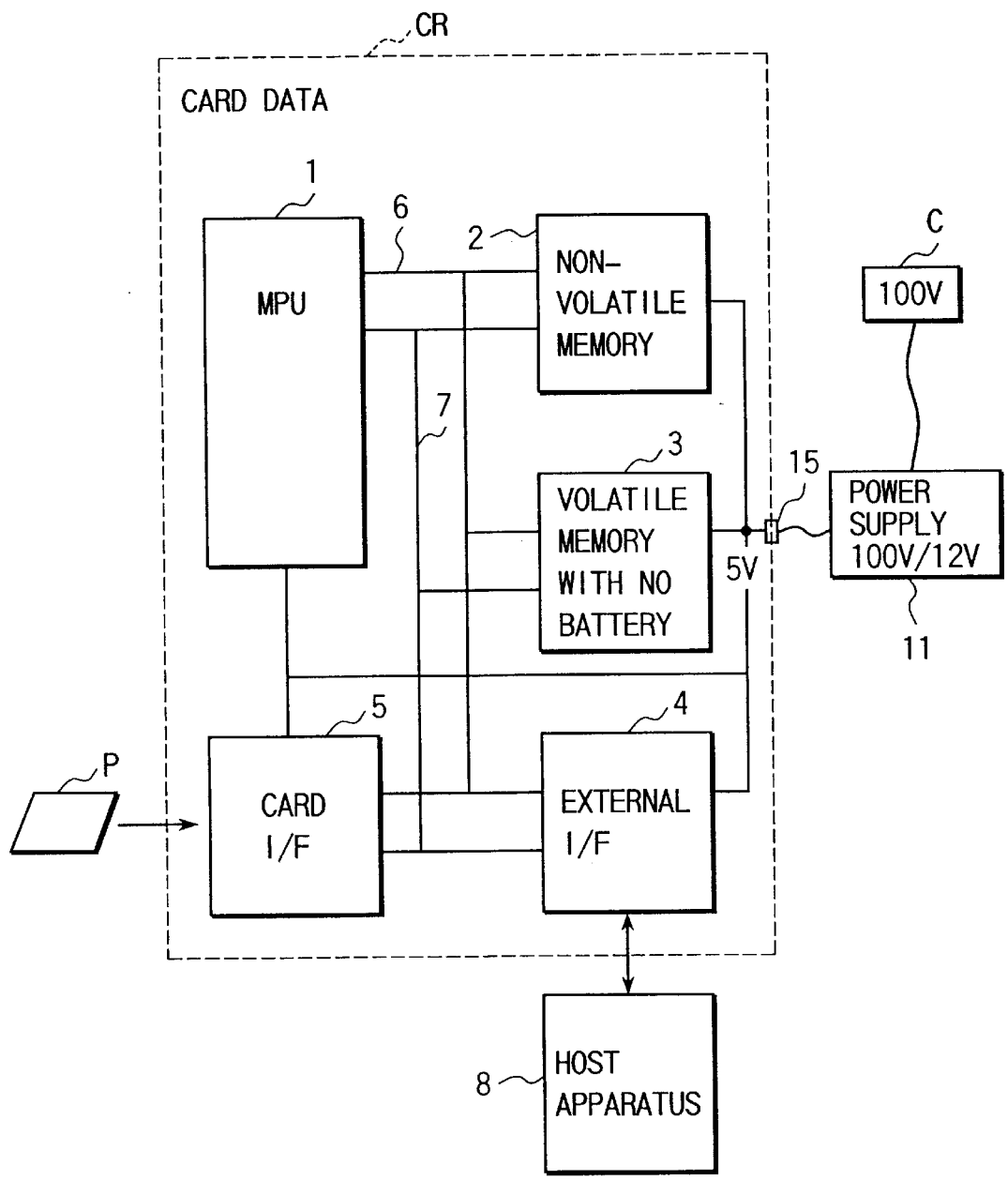
Figure 1C:
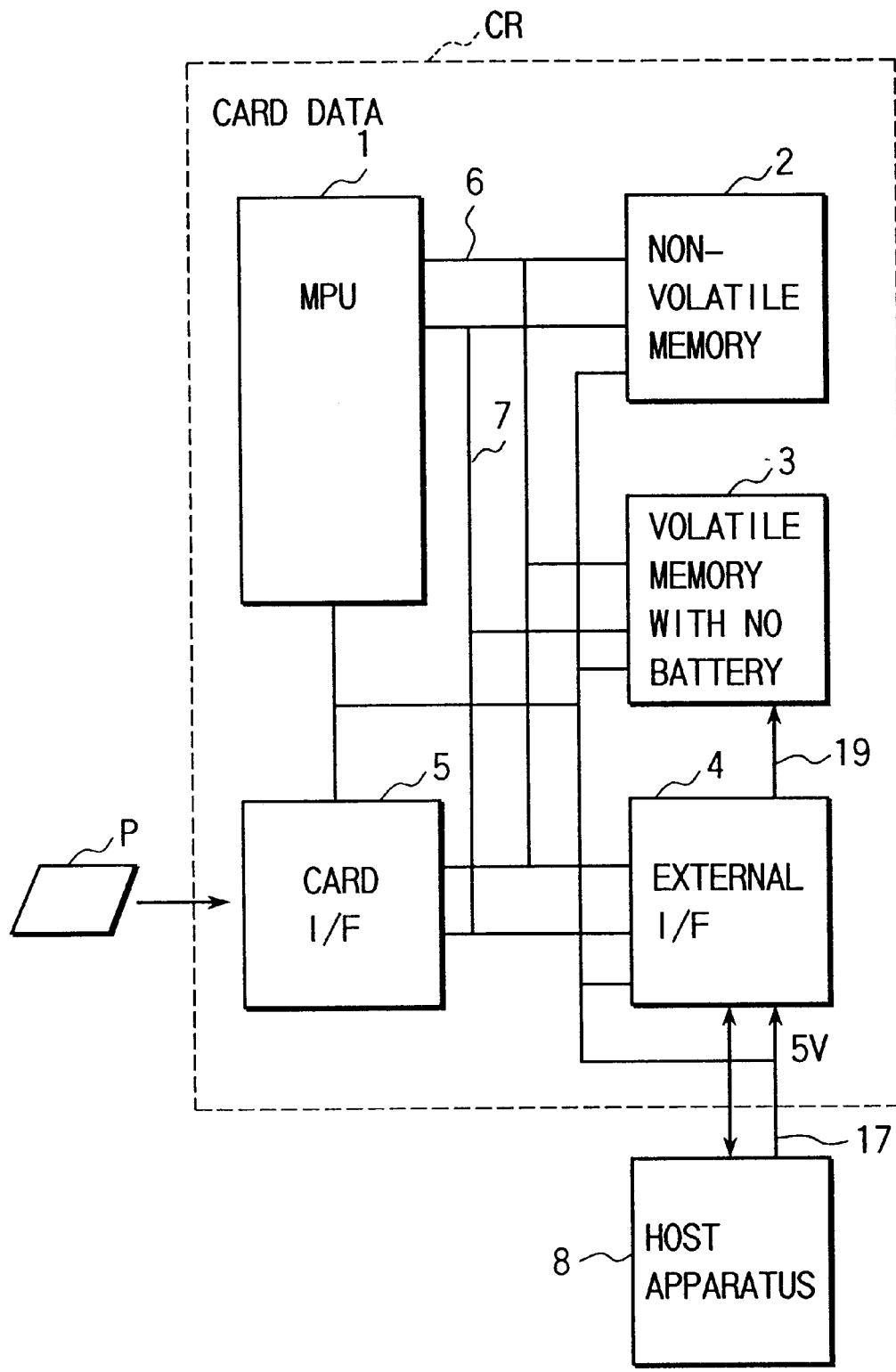

FIGS. 1A, 1B, and 1C show main elements of a card reader used for an entrance managing system, as an example of the schematic view of the structure of the data processing apparatus according to the embodiment of the present invention.

The card reader CR shown in FIG. 1A comprises a MPU 1 for controlling all the operations of the card reader, a non-volatile memory 2, a volatile memory 3 with no battery, an external interface (I/F) 4, and a card interface (I/F) 5. These elements are connected to each other by address bus 6 and data bus 7.

The card reader is supplied with power from an AC power supply C located outside of the apparatus through a power supply code 10 with no elements intervening therebetween. The supplied AC power is converted into DC 12V to be used as a power supply of the card reader CR, in particular, as a power supply of the volatile memory 3 having no backup battery.

As the volatile memory 3, the memory device from which data is lost when the power supply is stopped is used. Any memory device such as a general SRAM or DRAM may be used if the memory device has no battery for backing the stored data up. When the card reader CR with such a memory device is stolen, i.e., detached from the power supply code 10 and isolated from the power supply, the data processing program stored in the volatile memory 3 having no back-up battery is lost. Therefore, by using such a memory device, the security of the data processing program can be attained.

The non-volatile memory 2 stores therein the basic program (for example, firmware: a program for executing operations highly dependent on the hardware) of the card reader, in advance.

The external interface 4 is provided for the interface between the card reader and a host apparatus 8.

The volatile memory 3 stores therein the program/ data transmitted from the host apparatus 8 via the external interface 4.

A card interface 5 receives a portable information recording medium (hereinafter referred to as a "card") P such as an IC card of each passengers. The card interface 5 reads predetermined data necessary for determining whether or not the passenger may pass, or writes data in the card, in necessity.

The MPU 1 executes the data processing such as the identification in accordance with the program/data which is stored in the non-volatile memory 2 in advance and the program/data which is transmitted from the host apparatus 8 and stored in the volatile memory 3 only during a period of time when the apparatus is operating.

FIG. 1B also shows a data processing apparatus having the same structures of the apparatus shown in FIG. 1A, except for the power supply. In FIG. 1B, AC 100V supplied from an AC power supply is converted by 43 an external power supply 11 into a direct current having 12V, for example. The DC 12V is supplied to the volatile memory 3 with no backup battery via a power supply connector 15, with no elements intervening therebetween. It goes without saying that all the elements other than the card reader CR, i.e., the MPU 1, non-volatile memory 2, and external I/F 4, are supplied with the DC 12V.

Also in the card reader shown in FIG. 1B, when the DC current from the power supply code 11 is stopped due to theft or the like, the data processing program stored in the volatile memory 3 having no back-up battery is lost, as in the case shown in FIG. 1A.

Further, the card reader CR shown in FIG. 1C is supplied with the power from the host apparatus 8 through a connection cable 17, and the direct current having 12V for example is used as a power supply of the card reader.

Figure 2:
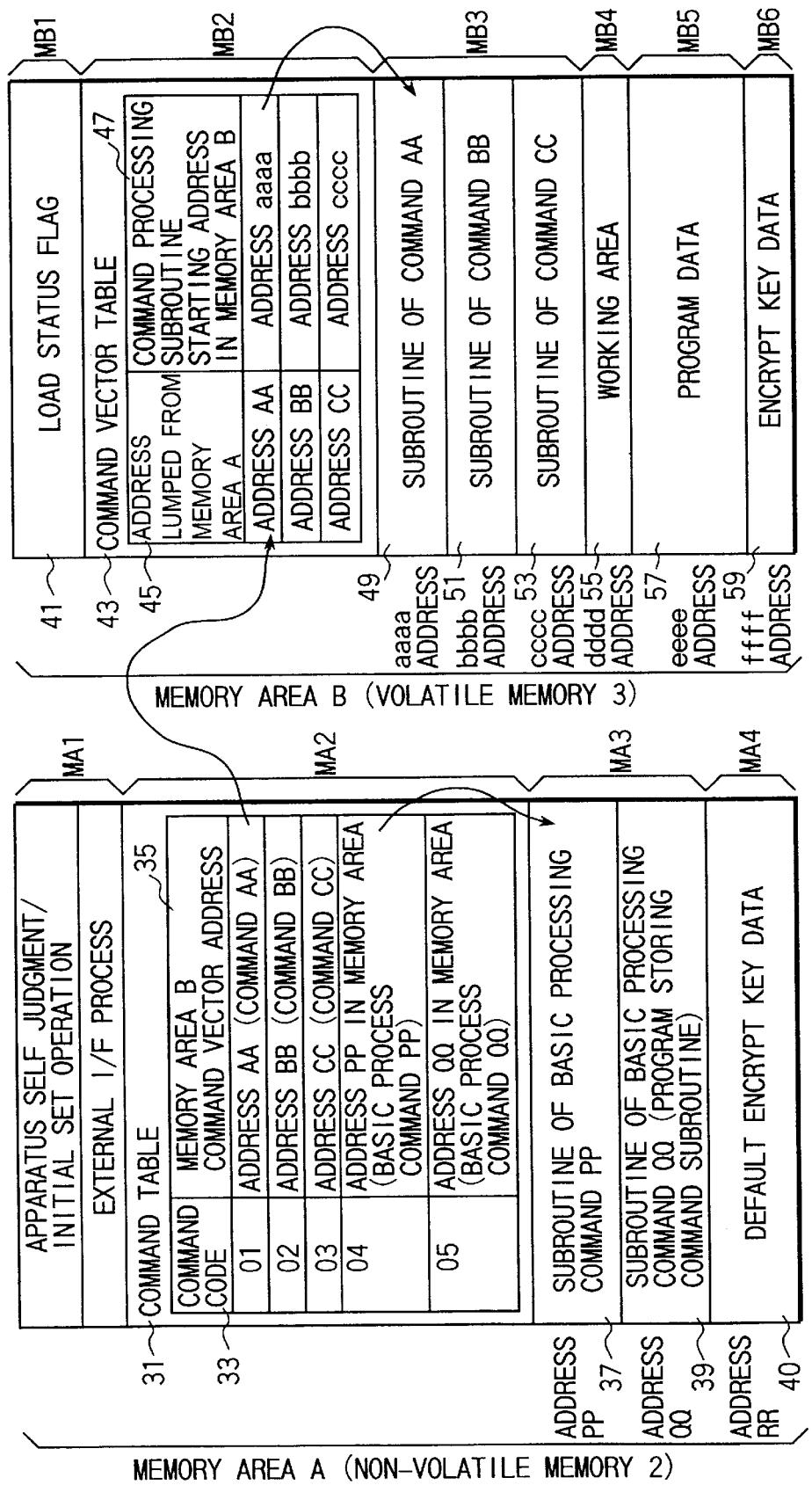
FIG. 2 shows the data assignments in non-volatile memory area and volatile memory area with no battery.

FIG. 2 shows the data assignments of the memory areas in the non-volatile memory 2 and volatile memory 3 having no backup battery. In FIG. 2, the memory area comprising the non-volatile memory 2 is denoted as a memory area A, the memory area comprising the volatile memory 3 is denoted as a memory area B.

The memory area A stores programs for executing basic operations highly dependent on the hardware of the card reader CR and data necessary for the basic operations. In a memory area MA1, the subroutine for "self-check/ initialization", executed when the card reader CR is turned on, and the subroutine for data transmission between the host apparatus 8 and the other external apparatuses are stored.

A memory area MA2 has a command table 31 storing vector table addresses 35 for indicating the addresses of command processing subroutines such as subroutines 49, 51, and 53 which are stored in the memory area B and correspond to each command code 33 (01, 02, 03, . . . ) transmitted from the host apparatus 8.

A memory area MA3 stores an execution program 39 for executing a program storing command instruction to store a program in a volatile memory having no backup battery. This is the main feature of the present invention. The memory area MA3 also stores program 39 for controlling the other basic operations.

A memory area MA4 stores default encryption key data 40 for synthesization of programs.

The memory area B stores program/data 57 transmitted from the host apparatus 8 through the external interface 4.

The memory area MB2 stores a command vector table 43 the addresses in which are shown in the command table 31 in the memory area MA2. The command vector table 43 indicates addresses 45 to each of which a program jumps from the memory area A, and the starting addresses of the command processing subroutines in the memory area B. The command vector table 43 is updated in necessity when program/data 57 is transmitted from the host apparatus 8.

The memory area MB3 stores command processing subroutines 49, 51, and 53, and the starting addresses of which are specified by the command vector table.

The memory area MB4 is used as a working area 55 when the MPU 1 is operating.

The memory area MB5 is used as a area in which program/data 57 other than the subroutines of the program being executed is stored.

A load status flag 41 stored in a memory area MB1 is provided to indicate the load status of the program or data transmitted from the host apparatus 8. The load status flag 41 is set in such a case where all the programs to be transmitted from the host apparatus 8 are received. The load status flag 41 is set as "1" in this time, and reset in the other time. While the load status flag 41 is reset, the memory area B is inhibited from being accessed. In this time, the processing using the command processing subroutines stored in the memory area B is also inhibited from being executed.

The memory area B comprises the volatile memory 3 having no backup battery, and thus is occupied by no program or data just as the card reader is turned on. Further, when the card reader is detached form the power supply (AC 100V or DC 12V supplied from the host apparatus), the data processing program/data stored in the memory area B will be lost. Therefore, by storing the program in the volatile memory, the security of the data processing program can be protected even if the card reader is stolen.

Figure 3:
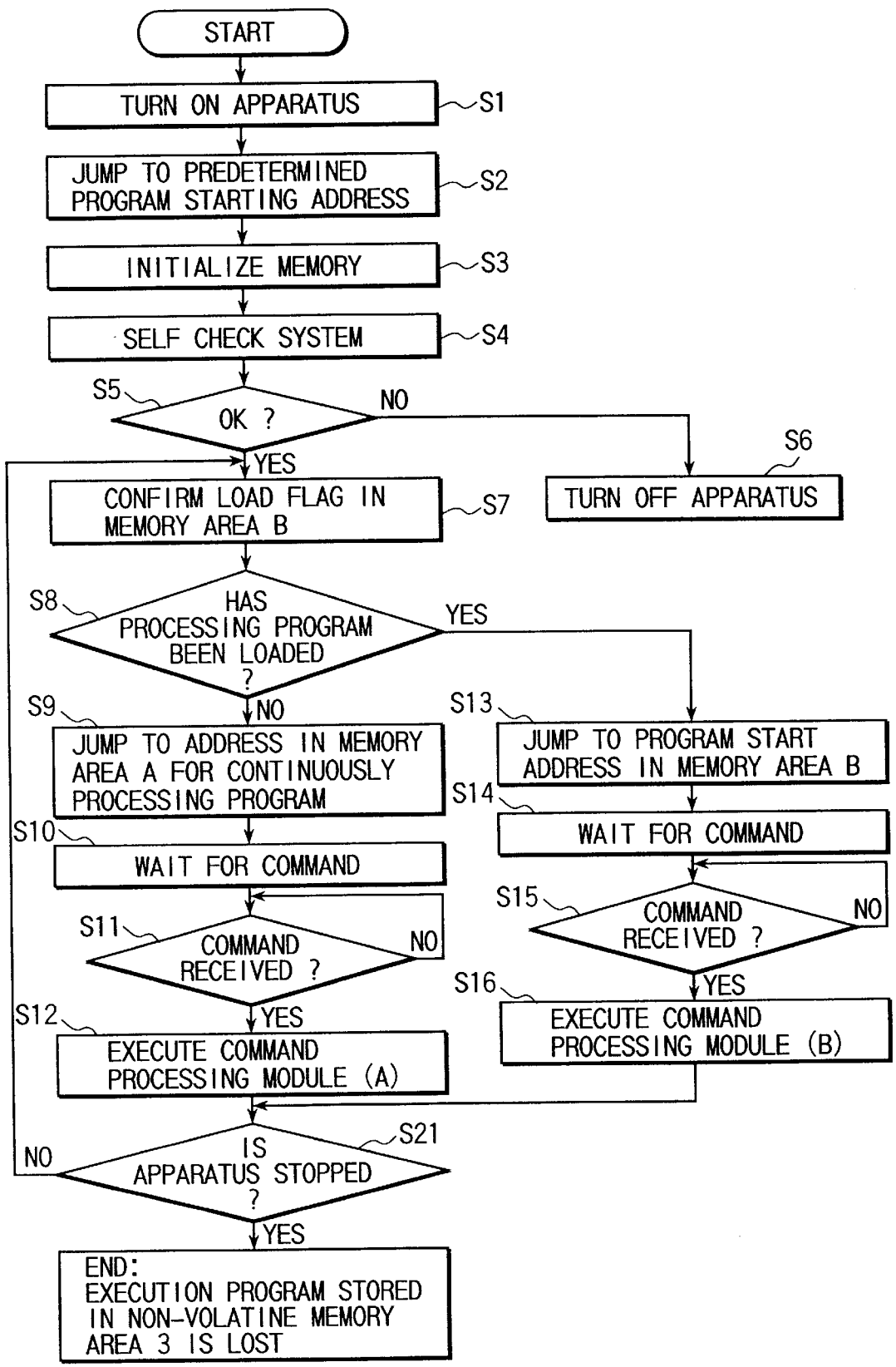
FIG. 3 is a flow chart describing steps using load status flag, command table, and command vector table of data processing of the data processing apparatus of the present invention.

The operation of the data processing apparatus shown in FIG. 1 will be described below with reference to the flow chart shown in FIG. 3.

When the apparatus is turned on (S1), the MPU 1 accesses a predetermined address in the non-volatile memory 2, i.e., the memory area A, from which the program is started (S2). In this time, the MPU 1 reads the initializing and self-check program from the memory area MA1, and executes the initializing and the self-check steps in accordance with the program (S3 and S4). The MPU 1 then starts to wait for commands to be transmitted from the external apparatus 8. If any error is detected during the self-check step, the operation of the system is stopped (S5, S6).

If no error is detected during the self-check step, the MPU 1 accesses the memory area MB1 to check whether the value of the load status flag is "1" or "0" (S7). When the program/data necessary for the operation is not loaded, the load status flag remains to be reset (S8), and step S9 is executed subsequently. When the load status flag is set (S8), then step S13 is executed.

In step S9, the program jumps to a predetermined address in the memory area A to be executed continuously, then waits for the command from the host apparatus 8 (S10). When the command is transmitted from the host apparatus 8 (S11), a command processing module A stored in the memory area A is executed (S12).

When the power supply outside the apparatus is disconnected from the apparatus (S21), the data processing program stored in the volatile memory area 3 is lost since the volatile memory area 3 has no backup battery. The card reader storing the program in this manner can attain high security.

Figure 4:
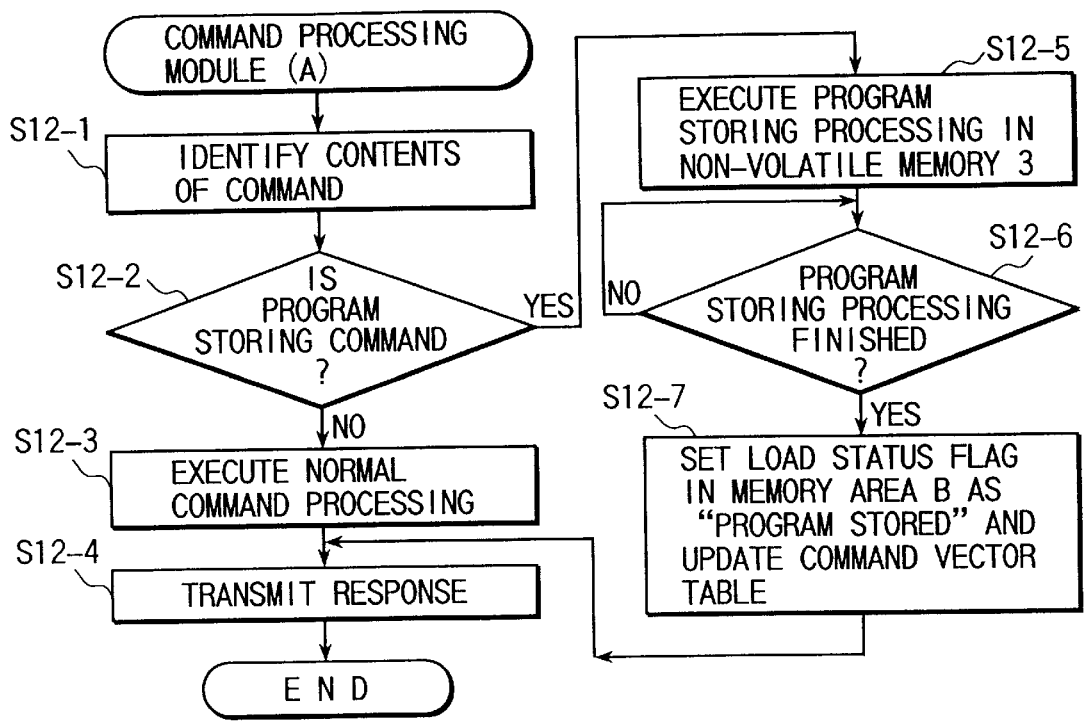
FIG. 4 is a flow chart describing the steps of the processing of the data processing apparatus of the present invention when no data is stored in the volatile memory.

FIG. 4 is a flow chart representing the steps of the process of the program/data processing apparatus of the present invention when no data is stored in the volatile memory. As represented in FIG. 4, the contents of the received command is identified at first in the command processing module A (S12-1), and it is determined whether or not the command is the program storing command, i.e., the command is the command instructing to load program/data from the host apparatus 8 (S12-2).

When the program is the command other than the program storing command (the command code "04", "05", for example), the normal command processing is executed (S12-3). After the command is processed, the response is transmitted to the host apparatus 8 (S12-4) to inform that the transmitted command is processed. More specifically, after the command is processed, the program then jumps to the first address ("PP", in the case of the command code "04") of the command processing subroutine on the command table, and then the MPU 1 processes the command in accordance with the program (subroutine), prepares the execution result response, and then transmits the response to the host apparatus 8.

When the program is the program storing command, the program storing processing for loading the program stored in the memory area A into the memory area B is executed (S12-5). In this time, the program/data located at the address specified by the program storing command and having bit amount specified by the program storing command is transmitted from the host apparatus 8 so as to be stored in the MB3 and MB5 in the memory area B. After all the program/data to be loaded have been transmitted (S12-6), the items in the command vector table MB2, which correspond to the loaded programs and data, are updated and the load status flag MB1 is set (S12-7). The response is then transmitted to the host apparatus 8 (S12-4).

By executing the above-mentioned steps from S12-5 to S12-7, the loading of the program/data into the memory area B has finished.

Further, when all the program/data necessary for the operation of the card reader is loaded from the host apparatus 8 at step S8 (i.e., when the load status flag is set), the program jumps to a predetermined starting address of the program in the memory area B (S13), and then waits for the command from the host apparatus 8 (S14). When the command from the host apparatus 8 is transmitted to the MPU 1 (S15), the command processing module B stored in the memory area B is executed (S16).

Figure 5:
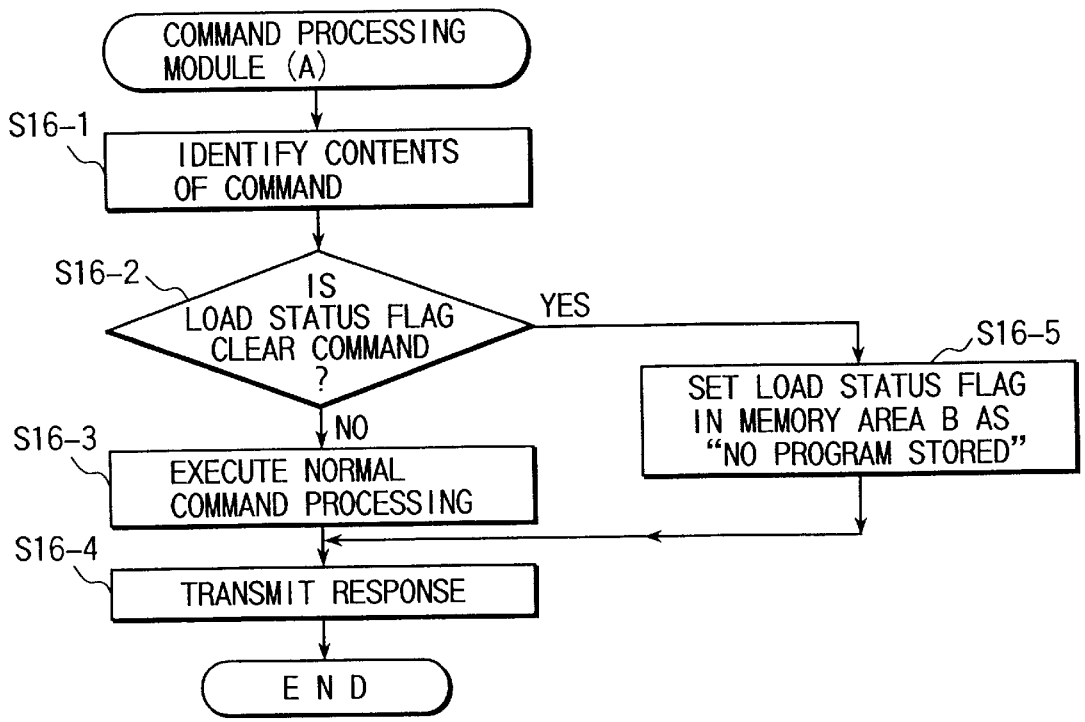
FIG. 5 is a flow chart describing the steps of the processing of the data processing apparatus of the present invention when data is stored in the volatile memory.

FIG. 5 is a flow chart representing the steps of processing the data processing apparatus of the present invention when program/data is stored in the volatile memory. As shown in FIG. 5, the contents of the received command is identified at first in the command processing module B (S16-1), and it is determined whether or not the command is the command for forcibly resetting the load status flag: the load status flag clear command (S16-2).

When the program is the command other than the load status flag clear command, the normal command processing is executed (S16-3). After the command is processed, the response is transmitted to the host apparatus 8 (S16-4).

In the normal command processing executed at S16-3, it is determined whether or not the program/data corresponding to the command is loaded in the memory area B. When the program/data has not. been loaded, step S16-4 is executed to prepare an error response to inform the host apparatus 8 thereof. When the corresponding program/data has been loaded, the command vector table shown in FIG. 2 is referred to obtain the starting address of the command processing subroutine. At the starting address, the command processing is executed. For example where the command code is set at "01", the command table shown in FIG. 2 is referred to obtain an address "AA". Then, the program jumps to the actual starting address "aaaa" of the command processing subroutine obtained with reference to the command vector table in the memory area B. After jumping to the address aaaa, the step S16-4 is executed to prepare a processing result response and transmit the response to the host apparatus 8.

When the received command is found to be load status flag clear command in the step S16-2, step S16-5 is executed to reset the load status flag in the memory area B. Then step S16-5 is executed to prepare the response based on the processing and transmit it to the host apparatus 8.

As described above, one or preferably all the parts of the command processing program from the external apparatus is loaded into the volatile memory 3 having no backup battery everytime when the apparatus if is turned on, and thus the processing subroutines cannot be easily read for the illegal object when the card reader is stolen.

Further, on the command table in the non-volatile memory 2, there are merely command codes and the corresponding addresses on the command vector table in the volatile memory 3, and no detail information of the commands. Accordingly, new command codes which are not used now but will be used in future can be easily added merely by loading the command processing subroutines corresponding to the command codes in the volatile memory 3 if the command codes and the corresponding addresses on the command vector table are stored in the command table in the non-volatile memory in advance. If a user thinks the command is unnecessary, the command is left to be unloaded. Further, according to this processing method, command codes and the function obtained thereby can be freely combined. This feature is particularly advantageous when the data processing apparatus of the present invention is incorporated into different systems for various purposes and the command code is desired to be different from each other though the function of the command is the same in all the systems.

By virtue of the load status flag provided in the memory area B located in the volatile memory 3, the volatile memory 3 need not to be unsuitably accessed even if the command which requires to use the program/ data to be stored in the memory area B is transmitted from the host apparatus 8, by using the non-volatile memory 2 and the volatile memory 3 suitably as described above.

Incidentally, if all the program/data transmitted from the host apparatus 8 is encrypted, the data which needs to be protected by high security can be prevented from being wiretapped when the data is transmitted.

In order to attain this object, the case where all the program/data transmitted between the data processing apparatus (card reader CR) and the host apparatus 8 is encrypted will be described below with reference to the flow chart shown in FIG. 6.

As in the cases described before, when the apparatus is turned on (S31), the MPU 1 accesses a predetermined address in the non-volatile memory 2 (i.e., the memory area A), from which the program is started (S2). In this time, the MPU 1 reads the initializing and self-check program from the memory area MA1, and executes predetermined operations in accordance with the program (S32 and S33). The MPU 1 then starts to wait for commands to be transmitted from the external apparatus 8 (S36). If any error is detected by the self-check, the operation of the system is stopped (S34, S35).

When the command is transmitted from the host apparatus 8 (S37), the content of the transmitted command is checked to determine whether or not the command is the program storing command, i.e., the command instructing to load the encrypted program/encrypted data from the host apparatus 8 (S38).

When the command is the command other than the program storing command (the command code "04", "05", indicated in FIG. 2, for example), the normal command processing is executed (S39). After the command is processed, the response is transmitted to the host apparatus 8 (S40). The program jumps to the first address ("PP", in the case of the command code "04") of the command processing subroutine described on the command table. The MPU 1 executes the command processing in accordance with the program, prepares the execution result response, and then transmits the response to the host apparatus 8.

If the power supply from the outside of the apparatus is stopped (S21), the processing program stored in the volatile memory area 3 having no backup battery is lost. The card reader enjoys high security thereby.

When the command is the program storing command, the program storing processing for loading the program stored in the memory area A into the memory area B is executed (S41). The encrypted program/data located at the address specified by the program storing command and having bit amount specified by the program storing command is transmitted from the host apparatus 8 and stored in the MB3 and MB5 in the memory area B (S43). In this time, at least the encrypted program is decrypted with use of the encryption key data stored in an address ffff in the memory area MB6 (S42). After all the encrypted program/encrypted data to be loaded has been transmitted (S44), the items in the command vector table, which correspond to the loaded programs/data are updated and the load status flag is set (S45). The response is then transmitted to the host apparatus 8 (S40).

The operation when the command other than the program storing command is transmitted from the host apparatus 8 will be described below with reference to the flow chart shown in FIG. 7. In FIG. 7, the same reference numerals as those shown in FIG. 6 are used to designate the same steps, and the description thereof will be omitted. The steps S31–S37 in FIG. 7 are the same as those of FIG. 6. The S50–S57 are not shown in FIG. 6 and will be described below.

When the command code is "01", the retrieval is executed in the command table MA2 to obtain an address "AA" (S51). If the desired command code does not exist in the command table, or the address corresponding to the command code does not exist in the command vector table, the response informing the command retrieval error is prepared (S52), and transmitted to the host apparatus (S61).

Figure 6:
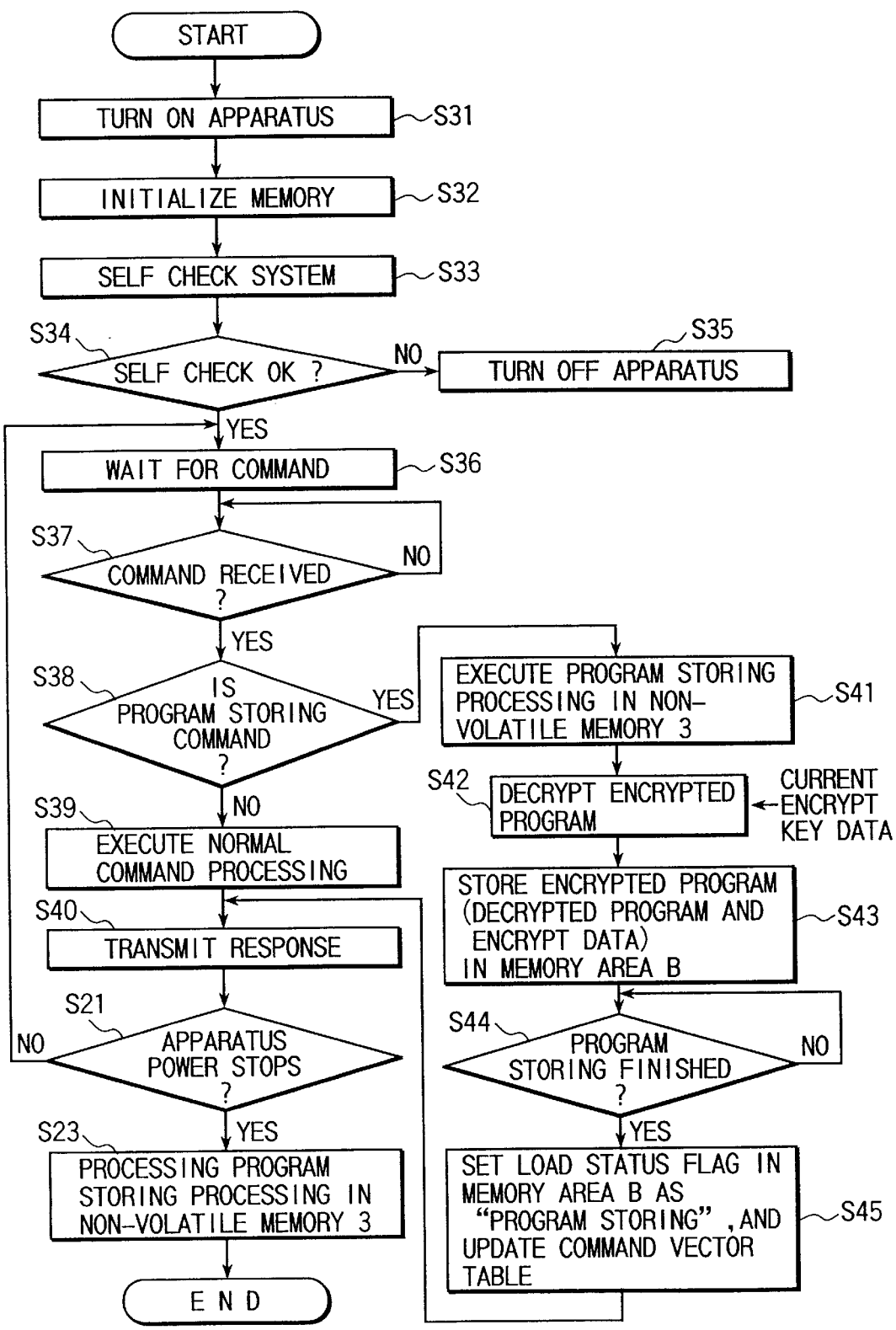
FIG. 6 is a flow chart describing the steps of the processing of the data processing apparatus of the present invention when the data transmitted between the data processing apparatus and the host apparatus shown in FIGS. 1A–1C is encrypted.
Figure 7:
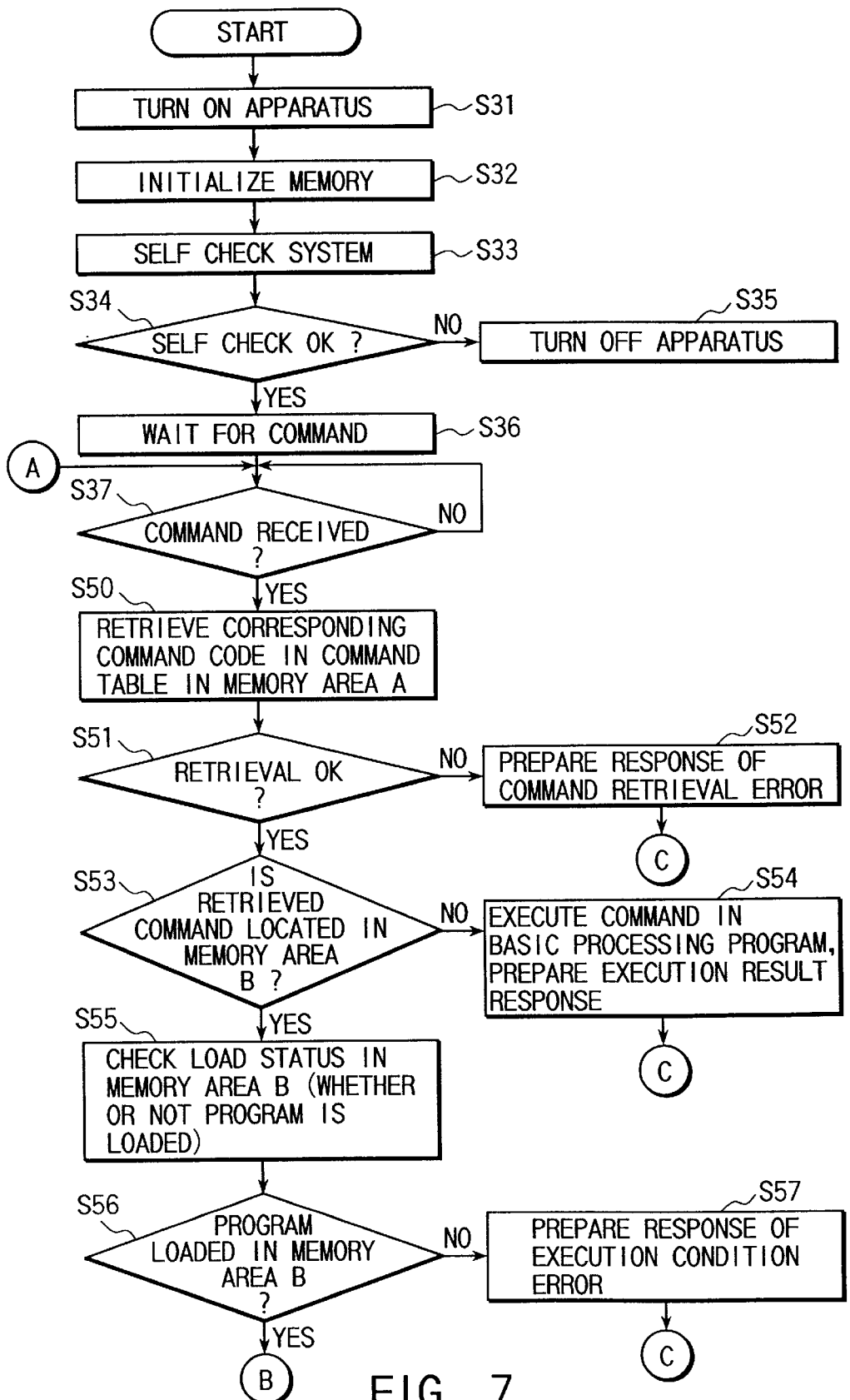
FIG. 7 is a flow chart describing the steps of the processing of the data processing apparatus of the present invention when the data transmitted between the data processing apparatus and the host apparatus shown in FIGS. 1A–1C is encrypted.

If the power supply is stopped from the outside of the apparatus (S21), the processing program stored in the volatile memory area 3 having no backup battery is lost, as in the case shown in FIG. 6. The card reader enjoys high security thereby.

When the address in the command vector table is located in the memory area B (S53), step S55 is executed subsequently. When the address in the command vector table is located in the memory area A, step S54 is executed to execute the command processing subroutine, and the execution result response informing the execution result is prepared to be transmitted to the host apparatus 8 (S61).

In step S55, the value of the load status flag stored in the memory area MB1 is checked. When the load status flag is set (S56), step S58 is executed next. When the load status flag remains to be reset, the error response informing thereof (execution condition error response) is prepared (S60) to be transmitted to the host apparatus 8 (S61).

Figure 8:
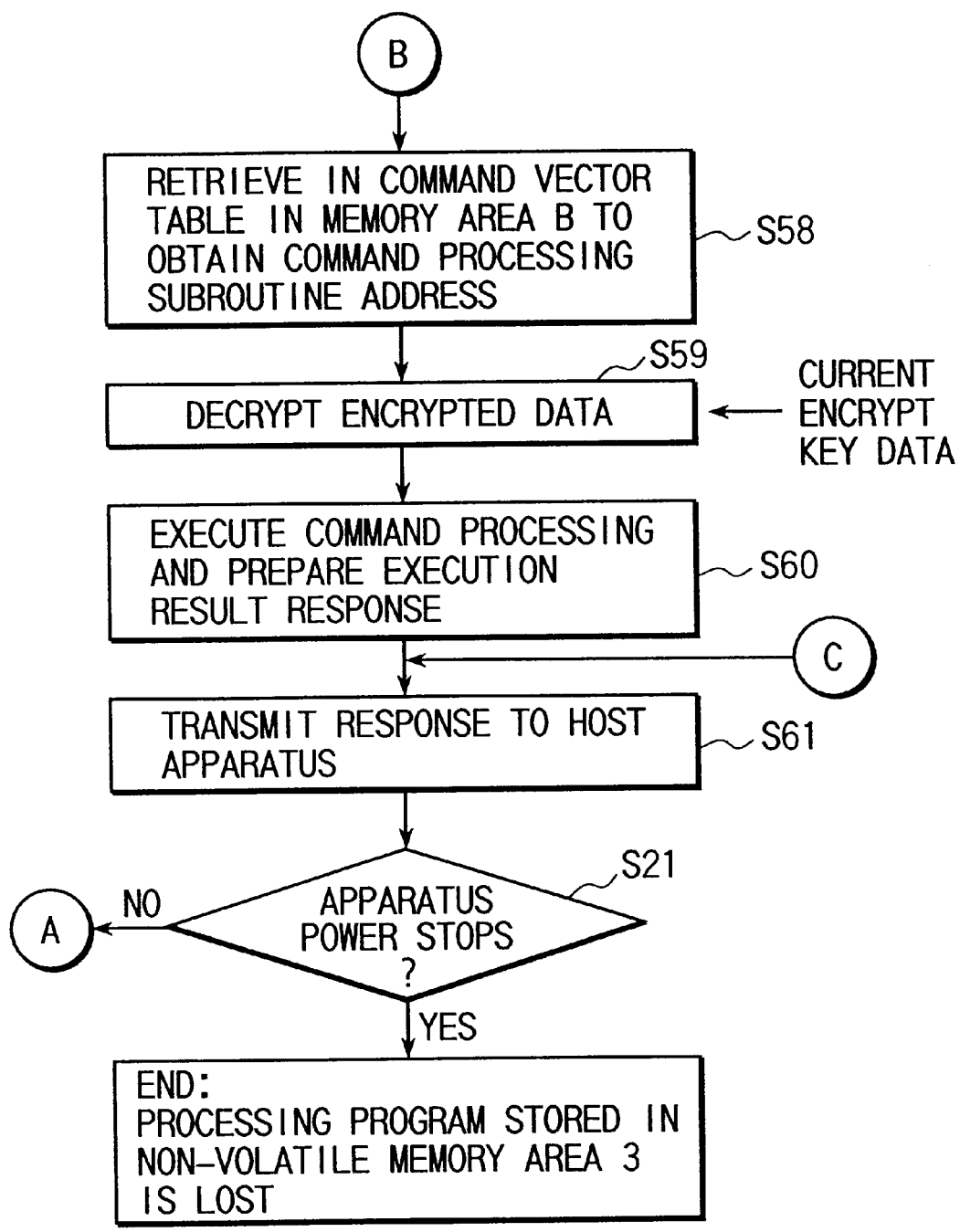
FIG. 8 is a flow chart describing the steps of the processing of the data processing apparatus of the present invention when the data transmitted between the data processing apparatus and the host apparatus shown in FIGS. 1A–1C is encrypted.

The subsequent steps are represented in FIG. 8. In step S58, the retrieval is executed in the command vector table to obtain the address in which the command processing subroutine on the basis of the address in the command vector table, which correspond to the received command code obtained by retrieving the command table. When the address is accessed to process the command, the data necessary for the execution of the processing (i.e., encrypted data which has not been decrypted yet in this time) is decrypted with use of the encryption key data stored in the address ffff in the memory area MB1, for example (S59).

A predetermined command processing is executed with use of the command processing subroutine which has already been decrypted and the data decrypted in S59, and the response informing thereof is prepared (S60) and transmitted to the host apparatus 8 (S61).

Figure 9:
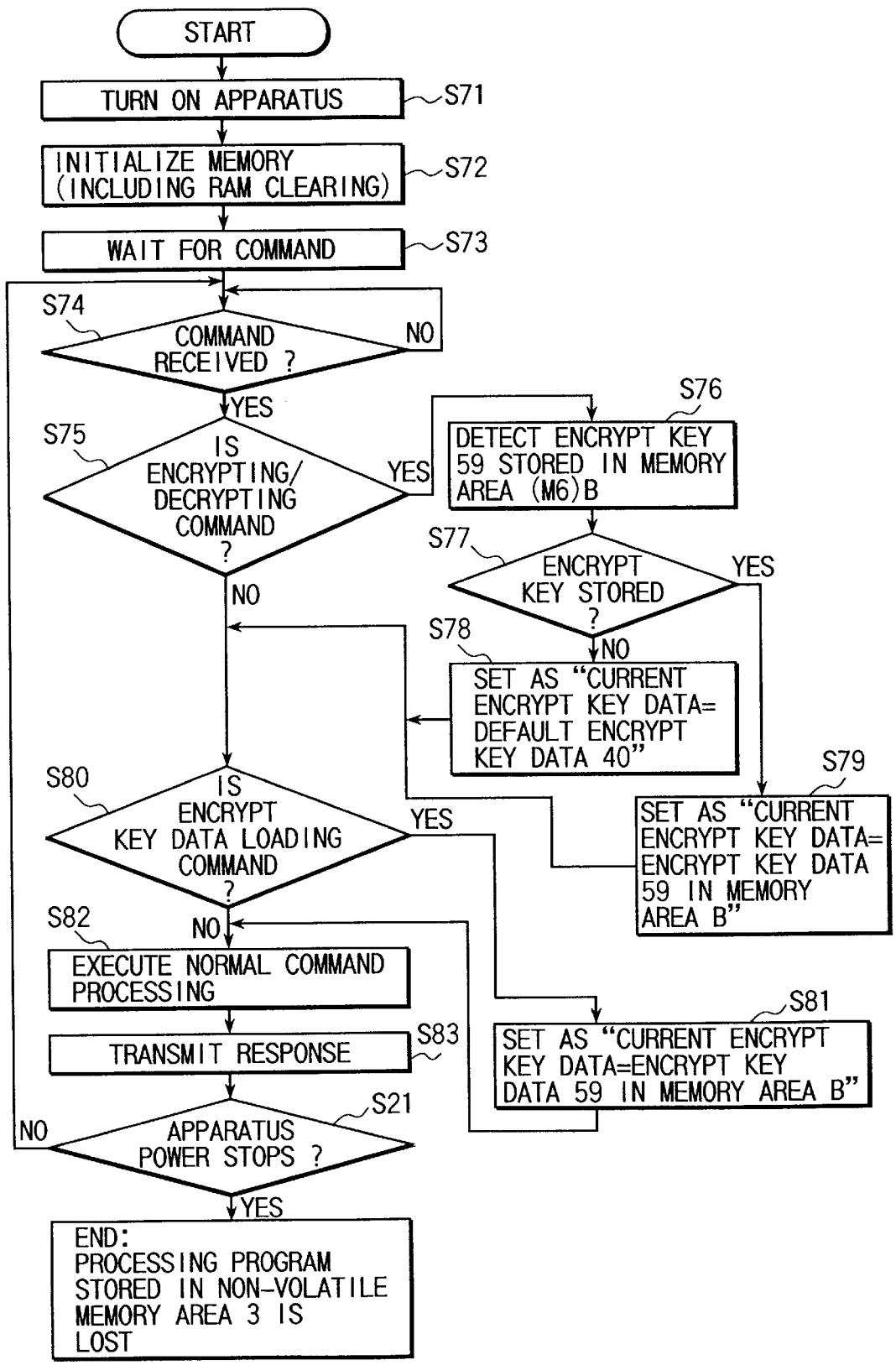
FIG. 9 is a flow chart describing the steps of the processing using encryption key data.

Next, the operation of the data processing apparatus (card reader CR) using the encryption key data will be described below with reference to the flow chart represented in FIG. 9.

As in the above cases, when the apparatus is turned on (S71), the MPU 1 accesses a predetermined address in the non-volatile memory 2, i.e., in the memory area A, from which the program is started. In this time, the MPU 1 reads the initializing and self-check program from the memory area MA1, and executes the initializing and self-check steps in accordance with the read program. The MPU 1 then starts to wait for commands to be transmitted from the external apparatus 8 (S73). When the initializing step is executed, the memory in the memory area B is cleared in this time.

When the command is transmitted from the host apparatus 8 (S74), the contents of the transmitted command is checked to determine whether or not the command processing instructed by the command needs to be encrypted/decrypted (S75).

When the command needs to be encrypted/decrypted, step S76 is executed to check whether or not the corresponding encryption key is stored in the memory area B. When a new encryption key has not been transmitted from the host apparatus 8 yet, the encryption key data of default stored in the memory area MA4 in advance is designated as the current encryption key data (S78), then step S80 is executed. When the new encryption key transmitted from the host apparatus 8 is stored in the memory area B, the stored encryption key data is designated as the current encryption key data (S79), and step S80 is executed then.

In S80, the transmitted command is checked to be determined whether or not the command is the command to load the encryption key data. When the command is the command to load the encryption key data, step S81 is then executed to receive new encryption key data from the host apparatus 8, and store the new encryption key data in a predetermined area in the memory area B.

When the command is not the command to load the encryption key data, the normal command processing is executed. When the command needs to be encrypted/decrypted for the command processing, the current encryption key data designated in step S78 or S79 is used to encrypt/decrypt the command.

After the normal command processing has finished, the response to inform of the processing result is prepared, and transmitted to the host apparatus 8 (S83).

If the power supply is stopped from the outside of the apparatus (S21), the processing program stored in the volatile memory area 3 having no backup battery is lost, as in the case shown in FIG. 6. The card reader enjoys high security thereby.

Further, similarly to the case where the encryption key data is to be changed, the identification information which is used when the card reader CR and the card P identify each other can be also changed merely by inserting the card P into the card reader CR. The card P may be very easily lost and used for an illegal object. It is thus highly effective for security to change the identification information so easily in this manner.

As described above, the program/data downloaded from the host apparatus 8 is encrypted, and when the data processing apparatus (card reader CR) receives it, at least program is decrypted and stored in the memory area B. According to the present invention, the encrypted data in the command processing is decrypted in necessity, and thus the security when the program/data is transmitted from the host apparatus 8 to the data processing apparatus (card reader) CR is protected.

In addition, when the command is encrypted in the command processing, the encryption key data used for the command processing is updated by replacing it with the encryption key data newly downloaded from the host apparatus 8. When the encryption key data is found to be stolen, new encryption key data is downloaded from the host apparatus 8, and the stolen encryption key data can be prevented from being used repeatedly. In this manner, not only the security of the data processing apparatus but also the security of the system comprising the data processing apparatus can be improved.

Consequently, the present invention can provide the data processing apparatus capable of easily changing the execution program, preventing the illegal use of the execution program and data, and attaining the improvement of the security of the program/data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A data processing apparatus for transmitting and receiving data to and from an external apparatus and a portable information recording medium, comprising:

a first interface for transmitting and receiving data to and from the external apparatus;

a second interface for transmitting and receiving data to and from the portable information recording medium;

a non-volatile memory for storing a first program regarding the data processing apparatus in advance;

a volatile memory having no backup battery, said volatile memory being supplied with power from the external apparatus through said first interface;

program storing means for storing a second program received by said first interface in said volatile memory;

erasing means for erasing said second program stored in said volatile memory when a power supply to said volatile memory from the external apparatus via said first interface is stopped; and processing means for transmitting and receiving data to and from the portable information recording medium, and processing the data in accordance with said first program stored in said non-volatile memory and said second program stored in said volatile memory.

2. The data processing apparatus according to claim 1, wherein said erasing means includes means for receiving an alternating current from outside of the data processing apparatus, converting said alternating current into a direct current having a predetermined voltage in order to supply to said volatile memory, and erasing the program stored in said volatile memory when said alternating power supply is stopped.

3. The data processing apparatus according to claim 1, wherein said program storing means includes means for receiving data for data processing from the external apparatus and storing said received data in said volatile memory having no backup battery when the data processing apparatus is started.

4. The data processing apparatus according to claim 1, wherein said program storing means includes means for storing in said non-volatile memory a first correspondence information having a plurality of commands supplied from outside of the data processing apparatus and a plurality of address information pieces respectively corresponding to said plurality of commands, and a means for storing in said volatile memory a second correspondence information having said address information pieces of said first correspondence information and address information pieces of a plurality of subroutines respectively corresponding to said address information pieces of said first corresponding information, and a plurality of subroutine programs respectively corresponding to said plurality of subroutine address information pieces.

5. The data processing apparatus according to claim 4, further including means for receiving a command from the outside, and executing one of said subroutine programs which corresponds to said received command.

6. The data processing apparatus according to claim 1, further comprising:
means for storing in said volatile memory, information representing whether said second program supplied from the external apparatus has been stored in the volatile memory;
checking means for checking said information stored in said volatile memory, when the data is processed; and
second processing means for processing the data in accordance with the first program stored in the non-volatile memory, when said checking means determines that said information is not stored in said volatile memory, and for processing the data in accordance with the second program stored in said volatile memory, when the checking means determines that said information is stored in said volatile memory.

7. The data processing apparatus according to claim 6, further comprising:
updating means for executing said first program stored in said non-volatile memory, updating said second program stored in said volatile memory to a third program transmitted from the external apparatus, and then storing in said volatile memory information representing whether said third program has been stored in said volatile memory, when said updating means receives a command instruction from the external apparatus to store said third program.

8. The data processing apparatus according to claim 1, wherein said program storing means includes means for receiving encrypted programs for processing data from the external apparatus, synthesizing said encrypted programs, and storing said synthesized programs in said volatile memory having no backup battery.

9. The data processing apparatus according to claim 1, wherein said program storing means includes means for receiving encryption data for processing data from the external apparatus, synthesizing said encryption data, and storing said synthesized data in said volatile memory having no backup battery.

10. The data processing apparatus according to claim 1, wherein said program storing means includes:
means for receiving encrypted programs for processing data supplied from the external apparatus, synthesizing said encrypted programs in accordance with encryption key data, and storing in said volatile memory having no backup battery; and
means for receiving from the external apparatus a command to change said encryption key data and changing said encryption key data.

11. A data processing method using an apparatus having a non-volatile memory for storing a first program regarding the apparatus in advance, said apparatus being designed to transmit and receive data to and from an external apparatus and a portable information recording medium, comprising:
receiving a second program from the external apparatus, and storing the second program in a volatile memory, which has no backup battery, and is operated with power supplied from the external apparatus;
storing in said volatile memory information representing whether said second program has been stored in said volatile memory when said second program has been stored in said volatile memory;
erasing said second program stored in said volatile memory when the power supply from the external apparatus is stopped;
checking the information stored in said volatile memory, when the data is transmitted to and from the portable information recording medium;
processing the data in accordance with said second program stored in the volatile memory when it is determined by said checking that the information has been stored in said volatile memory; and
processing the data in accordance with said first program in said non-volatile memory when it is determined by said checking that the information has not been stored in said volatile memory.

12. The data processing method according to claim 11, wherein said second program receiving and storing includes:
storing in said non-volatile memory a first correspondence information having a plurality of commands supplied from outside of the apparatus and a plurality of address information pieces respectively corresponding to said plurality of commands; and
storing in said volatile memory a second correspondence information having said address information of said first correspondence information and address information pieces of a plurality of subroutines respectively corresponding to said address information pieces of said first corresponding information, and a plurality of subroutine programs corresponding to the plurality of subroutine address information pieces.

13. The data processing method according to claim 11 wherein said second program receiving and storing includes:
storing in said non-volatile memory first correspondence information having a plurality of commands supplied from outside of the apparatus and a plurality of address information pieces respectively corresponding thereto;

storing in said volatile memory a second correspondence information having said address information pieces of said first correspondence information and address information pieces of a plurality of subroutines respectively corresponding to said address information pieces of said first corresponding information, and the plurality of subroutine programs corresponding to the address information pieces of the plurality of subroutine programs;

storing in said volatile memory storing finishing information indicating whether said second program supplied from the external apparatus has been stored in said volatile memory; and updating the first information and the second information with a command transferred from the external apparatus that instructs to store the program, and for setting said storing finishing information in a state indicating the information has been stored.

14. The data processing method according to claim 11, wherein said second program receiving and storing includes receiving encrypted programs from processing data supplied from the external apparatus, synthesizing the encrypted programs, and storing the synthesized program in said volatile memory having no backup battery.

15. The data processing method according to claim 11, wherein said second program receiving and storing includes receiving encryption data for processing data supplied from the external apparatus, synthesizing the encrypted data, and storing the synthesized data in said volatile memory having no backup battery.

16. The data processing method according to claim 11, wherein said second program receiving and storing includes determining whether encryption key data for synthesizing data supplied from the external apparatus is stored in said volatile memory; and determining whether to use standard encryption key data stored in the non-volatile memory as encryption key data for synthesizing the programs when it is determined that said encryption key data is absent in said volatile memory.

17. The data processing method according to claim 11, wherein said second program receiving and storing includes:

receiving encrypted programs for processing data from the external apparatus, synthesizing the encrypted programs in accordance with encryption key data, and storing in said volatile memory having no backup battery; and changing said encryption key data when a command to change said encryption key data is transferred from the external apparatus.

18. A data processing apparatus according to claim 10, wherein the program storing means includes:

means for determining whether encryption key data for synthesizing information supplied from the external apparatus is stored in the volatile memory; and means for determining use of standard encryption key data stored in the non-volatile memory as said encryption key data for synthesizing the programs when said determining means determines that said encryption key data is absent in the volatile memory.

* * * * *